US011476709B2

(12) United States Patent
Seibert et al.

(10) Patent No.: US 11,476,709 B2
(45) Date of Patent: Oct. 18, 2022

(54) WHEEL END APPARATUS WITH ELECTRIC GENERATOR

(71) Applicant: Consolidated Metco, Inc., Vancouver, WA (US)

(72) Inventors: Cody Seibert, Vancouver, WA (US); Brian Bove, Portland, OR (US); William Joseph Edwards, Portland, OR (US); Benjamin David Mortensen, Camas, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 82 days.

(21) Appl. No.: 16/690,683

(22) Filed: Nov. 21, 2019

(65) Prior Publication Data

US 2020/0161898 A1    May 21, 2020

Related U.S. Application Data

(60) Provisional application No. 62/770,544, filed on Nov. 21, 2018.

(51) Int. Cl.
*H02J 50/10* (2016.01)
*B60B 37/10* (2006.01)
*H02J 50/80* (2016.01)

(52) U.S. Cl.
CPC .............. *H02J 50/10* (2016.02); *B60B 37/10* (2013.01); *H02J 50/80* (2016.02); *B60B 2900/931* (2013.01); *F16C 2233/00* (2013.01)

(58) Field of Classification Search
CPC ........... H02J 50/10; H02J 50/80; B60B 37/10; B60B 2900/931; B60B 27/0068;
(Continued)

(56) References Cited

U.S. PATENT DOCUMENTS 2,600,029 A    6/1952   Rivington
2,747,454 A    5/1956   Bowersett
(Continued)

FOREIGN PATENT DOCUMENTS

CA    2957894 C     2/2019
CN    102267336 A   12/2011
(Continued)

OTHER PUBLICATIONS

U.S. Appl. No. 16/649,483, filed Mar. 20, 2020; 102 pages.
(Continued)

*Primary Examiner* — Nghia M Doan
(74) *Attorney, Agent, or Firm* — Fitch, Even, Tabin & Flannery LLP

(57) ABSTRACT

In accordance with one aspect of the present disclosure, a wheel end apparatus for a vehicle is provided that includes a wheel hub assembly configured to be mounted to a spindle and a wheel hub of the wheel hub assembly. The wheel end apparatus includes a coil of wire and at least one magnet of the wheel hub assembly configured to move relative to one another with rotation of the wheel hub around the spindle. The wheel end apparatus includes a wheel end device operably coupled to the coil of wire to receive electrical power generated by relative movement of the coil of wire and the at least one magnet. Further, the wheel end apparatus includes communication circuitry operably coupled to the wheel end device and configured to wirelessly communicate wheel end device information with a wheel end monitoring device.

32 Claims, 6 Drawing Sheets

(58) Field of Classification Search
CPC .... F16C 41/008; F16C 19/364; F16C 19/548; F16C 33/664; F16C 33/7813; F16C 2233/00; F16C 41/004; F16C 2326/02
See application file for complete search history.

(56) References Cited

U.S. PATENT DOCUMENTS

| | | | |
|---|---|---|---|
| 3,823,639 A | 7/1974 | Liber | |
| 4,021,690 A | 5/1977 | Burton | |
| 4,157,530 A | 6/1979 | Merz | |
| 4,333,351 A | 6/1982 | Bickford | |
| 4,529,961 A | 7/1985 | Nishimura | |
| 4,761,577 A | 8/1988 | Thomas | |
| 4,904,132 A | 2/1990 | Popenoe | |
| 5,757,084 A | 5/1998 | Wagner | |
| 5,828,135 A | 10/1998 | Barrett | |
| 5,945,665 A | 8/1999 | Hay | |
| 6,149,244 A | 11/2000 | Wagner | |
| 6,204,771 B1 | 3/2001 | Ceney | |
| 6,358,051 B2 | 3/2002 | Lang | |
| 6,358,061 B1 | 3/2002 | Regnier | |
| 6,398,395 B1 | 6/2002 | Hyun | |
| 6,490,935 B1 | 12/2002 | Joki | |
| 6,535,135 B1 | 3/2003 | French | |
| 6,617,968 B1 | 9/2003 | Odisho | |
| 6,675,640 B2 * | 1/2004 | Ehrlich | B60T 8/00 73/115.08 |
| 7,034,711 B2 | 4/2006 | Sakatani | |
| 7,369,966 B1 | 5/2008 | Scelsi | |
| 7,412,898 B1 | 8/2008 | Smith | |
| 7,466,049 B1 | 12/2008 | Vancea | |
| 7,703,669 B2 | 4/2010 | Amirehteshami | |
| 8,131,420 B2 | 3/2012 | Lynch | |
| 8,448,520 B1 | 5/2013 | Baroudi | |
| 8,540,468 B2 | 9/2013 | Mekid | |
| 8,683,869 B2 | 4/2014 | Herley | |
| 8,695,432 B2 | 4/2014 | Hsieh | |
| 8,707,776 B2 | 4/2014 | Fischer | |
| 8,836,503 B2 | 9/2014 | Gelvin | |
| 8,978,967 B2 | 3/2015 | Gamboa | |
| 2002/0033638 A1 * | 3/2002 | Okada | F16C 41/008 303/20 |
| 2003/0093188 A1 | 5/2003 | Morita | |
| 2005/0047692 A1 | 3/2005 | Niebling | |
| 2007/0018837 A1 | 1/2007 | Mizutani | |
| 2007/0215032 A1 * | 9/2007 | Melberg | G01K 5/62 116/218 |
| 2008/0117036 A1 | 5/2008 | Kenny | |
| 2009/0096599 A1 | 4/2009 | Kranz | |
| 2009/0207008 A1 | 8/2009 | Malis | |
| 2009/0284362 A1 * | 11/2009 | Wilson | B60C 23/00336 340/449 |
| 2010/0050778 A1 | 3/2010 | Herley | |
| 2010/0135604 A1 | 6/2010 | Ozaki | |
| 2011/0291467 A1 | 12/2011 | Severini | |
| 2013/0044972 A1 * | 2/2013 | Ohtsuki | F16J 15/3264 384/448 |
| 2014/0070935 A1 | 3/2014 | Wang | |
| 2014/0309860 A1 | 10/2014 | Paulin | |
| 2015/0210350 A1 | 7/2015 | Biderman | |
| 2015/0292996 A1 | 10/2015 | Hsieh | |
| 2015/0336527 A1 | 11/2015 | Ghannam | |
| 2016/0076948 A1 | 3/2016 | Hossle | |
| 2017/0206720 A1 | 7/2017 | Ellis | |
| 2017/0261450 A1 | 9/2017 | Baarman | |
| 2018/0019636 A1 | 1/2018 | Roberts | |
| 2018/0118158 A1 | 5/2018 | Davis | |
| 2018/0202480 A1 | 7/2018 | Kumar | |
| 2018/0372769 A1 * | 12/2018 | Gunji | H02K 21/22 |
| 2019/0023118 A1 | 1/2019 | Van Der Wal et al. | |
| 2019/0249706 A1 | 8/2019 | Hess | |
| 2020/0130435 A1 | 4/2020 | Root | |
| 2020/0164704 A1 * | 5/2020 | Ciocia | B60B 27/02 |
| 2020/0238755 A1 | 7/2020 | Carr | |
| 2021/0110620 A1 | 4/2021 | Mortensen | |

FOREIGN PATENT DOCUMENTS

| | | |
|---|---|---|
| CN | 102738921 A | 10/2012 |
| CN | 102781768 A | 11/2012 |
| CN | 204858841 U | 12/2015 |
| CN | 105667303 A | 6/2016 |
| CN | 106715163 A | 5/2017 |
| CN | 206490517 U | 9/2017 |
| CN | 110022035 A | 7/2019 |
| CN | 110789658 A | 2/2020 |
| CN | 111245121 A | 6/2020 |
| CN | 212649239 U | 3/2021 |
| DE | 102005055597 A1 | 5/2007 |
| DE | 102013214580 A | 1/2015 |
| DE | 102014218370 A1 | 3/2016 |
| DE | 102015216576 A1 | 3/2017 |
| EP | 3043083 A1 | 7/2016 |
| FR | 2669728 A1 | 5/1992 |
| KR | 101389218 B1 | 4/2014 |
| WO | 2015010693 A1 | 1/2015 |
| WO | 2016040763 A2 | 3/2016 |
| WO | 2017072143 A1 | 5/2017 |
| WO | 2017073646 A1 | 5/2017 |
| WO | 2019060728 A1 | 3/2019 |
| WO | 2019213702 A1 | 11/2019 |

OTHER PUBLICATIONS

International Search Report and Written Opinion from PCT/US2019/062586 dated Jan. 22, 2020; 16 pages.

Faraday's law of induction definition from Wikipedia printed from Wayback Machine https://en.wikipedia.org/wiki/Faraday's_law_of_induction dated Sep. 23, 2018; 11 pages.

Checkpoint Medium Arrow®; Technical Data Sheet from www.checkpoint-safety.com; publicly available before Oct. 9, 2019; 2 pages.

DTI SmartBolts; DTI Visual Indication System™ product guide printed from Wayback Machine Archive dated Sep. 13, 2019 of http:www.smartbolts.com; 5 pages.

Safewheel®; Technical Data Sheet from www.checkpoint-safety.com; publicly available before Oct. 9, 2019; 2 pages.

Salisbury, Mark; New Technology Launched Offering World First in Heavy Fleet Wheel and Tyre Security from https://www.fleetpoint.org/fleet-management-2/new-technology-launched-offering-world-first-in-heavy-fleet-wheel-and-tyre-security/; Nov. 27, 2018; 5 pages.

Squirrel®; Technical Data Sheet from www.checkpoint-safety.com; publicly available before Oct. 9, 2019; 2 pages.

Valley Forge & Bolt Mfg. Co. website printed from Wayback Machine Archive dated Oct. 31, 2018 of https://www.vfbolts.com; 11 pages.

Extended European Search Report from related European Patent Application No. 19887940.5, dated Jul. 4, 2022; 10 pages.

Examination Report from related Indian Patent Application No. 202147026324, dated Sep. 7, 2022; 6 pages.

* cited by examiner

WHEEL END APPARATUS WITH ELECTRIC GENERATOR

CROSS-REFERENCE TO RELATED APPLICATION

This application claims the benefit of U.S. Provisional Patent App. No. 62/770,544, filed Nov. 21, 2018, which is hereby incorporated herein in its entirety.

FIELD

This disclosure relates to wheel ends for vehicles and, more specifically, to wheel ends having electrically-powered devices for providing wheel end functionality.

BACKGROUND

A wheel end may include a wheel hub assembly mounted on a spindle of a vehicle axle to provide a rotatable connection point for mounting a wheel and tire assembly to the vehicle. Wheel hub assemblies for commercial vehicles such as heavy-duty trucks come in a variety of configurations depending on whether the wheel is a driven wheel, trailer wheel, or tandem wheel. Wheel hub assemblies generally include a wheel hub and inboard and outboard roller bearings mounted therein that receive the spindle of the vehicle axle.

SUMMARY

In accordance with one aspect of the present disclosure, a wheel end apparatus for a vehicle is provided that includes a wheel hub assembly configured to be mounted to a spindle and a wheel hub of the wheel hub assembly. The wheel end apparatus includes a coil of wire and at least one magnet of the wheel hub assembly configured to move relative to one another with rotation of the wheel hub around the spindle. The wheel end apparatus includes a wheel end device operably coupled to the coil of wire to receive electrical power generated by relative movement of the coil of wire and the at least one magnet. Further, the wheel end apparatus includes communication circuitry operably coupled to the wheel end device and configured to wirelessly communicate wheel end device information with a wheel end monitoring device. The wheel end apparatus permits the wheel hub assembly be mounted to a spindle and the rotation of the wheel hub to generate electrical power for the wheel end device and the communication circuitry. Because the rotation of the wheel hub is used to generate electrical power for the wheel end device and the communication circuitry, the electrical power demands and lifespan of the wheel end device and the communication circuitry may not be not limited by the capacity of an associated battery. Rather, the coil of wire and the at least one magnet are configured according to the power demands of the wheel end device and the communication circuitry. This is a departure from the conventional approach of a battery dictating the power demands of a device on an associated wheel hub. The wheel end device thereby permits a manufacturer to provide wheel end functionality independent of conventional battery power supply considerations.

In one embodiment, the wheel hub assembly includes the wheel end device and the communication circuitry. The wheel hub assembly thereby provides a self-contained apparatus that may be mounted to a conventional spindle of a commercial vehicle and provides wheel end device functionality, such as wheel stud tension monitoring, wheel hub oil temperature monitoring, and bearing condition monitoring as some examples.

In one embodiment, the coil of wire and the at least one magnet are inside of the wheel hub and the communication circuitry includes an antenna outside of the wheel hub. Because the coil of wire and at least one magnet are inside of the wheel hub, the coil of wire and the at least one magnet may interact and generate electrical power while being protected from tampering and harsh environmental conditions. Further, the antenna of the communication circuitry outside of the wheel hub permits wireless communications to be transmitted from the wheel end with reduced interference from the wheel hub.

In another aspect of the present disclosure, a wheel end system is provided that includes a wheel hub, at least one bearing mounted in the wheel hub, and a cavity for receiving a lubricant. The cavity opens to the at least one bearing to permit the lubricant to lubricate the at least one bearing. The wheel end system further includes a coil of wire and at least one magnet in the cavity configured to move relative to one another with rotation of the wheel hub around the spindle. The wheel end system further includes a wheel end device operably coupled to the coil of wire to receive electrical power generated by the relative movement of the coil of wire and the at least one magnet. In this manner, the coil of wire and at least one magnet are positioned in the lubricant-receiving cavity of the wheel hub which protects the coil of wire and the at least one magnet from environmental conditions.

A method is also provided for utilizing rotation of a wheel hub of a wheel hub assembly mounted to a spindle to operate a wheel end device. The method includes providing electrical power to the wheel end device and communication circuitry by moving a coil of wire and at least one magnet of the wheel hub assembly relative to one another with rotation of the wheel hub of the wheel hub assembly around the spindle. The method further includes wirelessly communicating, via the communication circuitry, wheel end device information with a wheel end monitoring device. The method permits the wheel end device and the communication circuitry to be powered by the rotation of the wheel hub around the spindle, which limits maintenance downtime for battery replacement and provides greater flexibility in power demands for the wheel end device and the communication circuitry.

DETAILED DESCRIPTION

Figure 1:
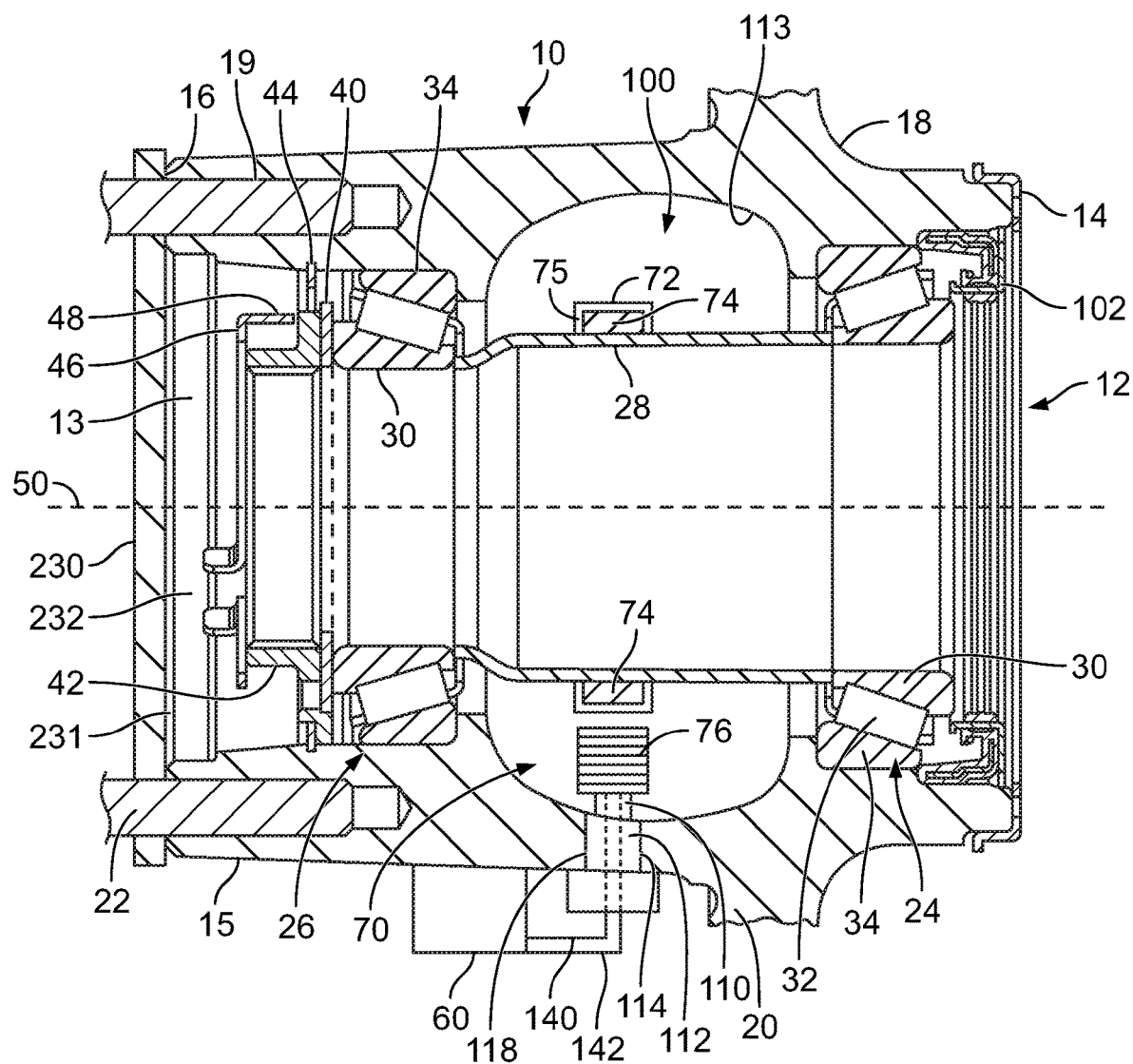
FIG. 1 is a cross-sectional view of a wheel hub assembly having an electric generator for providing electrical power to a device of the wheel hub assembly.

With reference to FIG. 1, a wheel end apparatus such as a wheel hub assembly 10 is provided that includes a hub bore 12 for receiving a spindle of a vehicle axle. The wheel hub assembly 10 has an inboard end portion 14 for facing the vehicle and an outboard end portion 16 for facing away from the vehicle. The wheel hub assembly 10 includes a wheel hub 18 having a flange 20 with studs for mounting one or two wheels to the wheel hub 18. The wheel hub 18 includes an interior 13 that contains components of the wheel hub assembly 10 and an exterior 15. The wheel hub 18 includes recesses 19 that receive drive studs 22 for connecting to a drive flange 230 of a drive axle shaft that extends within the vehicle axle spindle received in the hub bore 12. The rest of the drive axle shaft and the spindle are not shown in FIG. 1 for clarity purposes.

The wheel hub assembly 10 includes an inboard bearing 24, an outboard bearing 26, and a spacer 28 separating the inboard and outboard bearings 24, 26. The inboard and outboard bearings 24, 26 each include an inner race or cone 30 mounted to the spindle, a plurality of rollers such as tapered rollers 32, and an outer race or cup 34. The wheel hub assembly 10 includes a spindle retaining nut 42 that threadingly engages with the spindle. A washer 40 is captured between the retaining nut 42 and the cone 30 of the outboard bearing 26. The retaining nut 42 and the washer 40 interlock on the spindle to resist loss of preload compression on the inner and outer bearings 24, 26. The wheel hub assembly 10 further includes a bore retaining ring 44 that inhibits movement of the outboard cone 30 and a nut retaining ring 46. The nut retaining ring 46 has a pin 48 that extends through an aperture in the retaining nut 42 and engages an opening in the washer 44 to resist loosening rotation of the retaining nut 42.

The hub bore 12 has a central axis 50. When the spindle is received in the hub bore 12, the cone 30 of the inboard bearing 24, the spacer 28, the cone 30 of the outboard bearing 26, the washer 40, the retaining nut 42, the bore retaining ring 44, and the nut retaining ring 46 are fixed to the spindle and are stationary relative thereto. Once the one or more wheels have been mounted to the wheel hub 18, rotation of the drive flange 230 produces rotation of the wheel hub 18, the one or more wheels mounted thereto, and the cups 34 of the inboard and outboard bearings 24, 26 around the central axis 50.

The wheel hub assembly 10 includes one or more devices 60 that provides wheel related functionality for the vehicle. For example, the device 60 may include one or more wheel end devices such as a tire pressure sensor, an air pump, an odometer, a temperature sensor, a vibration sensor, a bearing condition monitoring sensor, a load measurement sensor, a stud tension sensor, an oil condition and level sensor, a spindle nut torque sensor, a speed sensor, an anti-lock brake sensor, or a combination thereof. In other embodiments, the device 60 may be a component of the wheel secured to the wheel hub 18 or mounted to the spindle inboard of the wheel hub 18 as some examples.

The device 60 utilizes electricity to operate, and the wheel hub assembly 10 includes an electric generator, such as an electromagnetic induction generator 70, configured to provide electrical power to the device 60. Regarding FIGS. 1 and 2, the electromagnetic induction generator 70 includes a stator such as one or more magnets 74 and a rotor such as one or more coils 76, each coil 76 having one or more turns of wire. The electromagnetic induction generator 70 includes an annular member, such as a collar 72 and the spacer 28, that support the magnets 74. The electromagnetic induction generator 70 includes an attachment member, such as a body 75 of the collar 72, that secures the magnets 74 to the spacer 28 and a support, such as a bobbin 110 (see FIG. 3), that connects the coil 76 to the wheel hub 18 and supports the coil 76 in proximity to the magnets 74. The magnets 74 are mounted to the spindle via the body 75 of the collar 72 and the spacer 28. As the wheel hub 18 and the coil 76 connected thereto rotate around the spacer 28 and collar 72, the coil 76 pass through magnetic fields produced by the magnets 74. The movement of the coil 76 through the magnetic fields induces a current and a voltage in the coil 76 and provides electrical power to the device 60. In another embodiment, the electromagnetic induction generator 70 has a stator including one or more coils 76 mounted to the spindle and a rotor including one or more magnets 74 mounted to the wheel hub 18.

In one embodiment, the body 75 of the collar 72 is made of a metallic material such as steel or a plastic material such as nylon. The one or more magnets 74 may include magnets made of ferrous materials and/or non-ferrous materials such as rare earth elements. The one or more magnets 74 may be permanent magnets. The one or more magnets may be electromagnets. The coil 76 is made of a metallic material, such as copper. In one embodiment, the wire of the coil 76 includes a magnet wire with an insulated coating such as epoxy.

Figure 2:
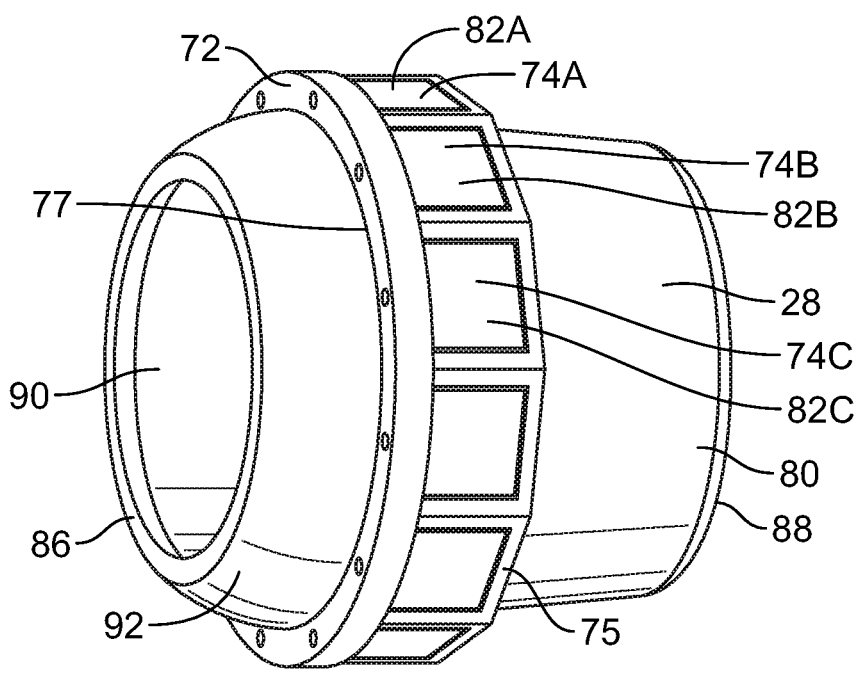
FIG. 2 is a perspective view of a spacer of the wheel hub assembly of FIG. 1 showing magnets of the electric generator mounted to the spacer.

Regarding FIG. 2, the magnets 74 may include magnets 74A, 74B, 74C, etc. and the collar 72 positions the magnets 74 around a circumference of a side wall 80 of the spacer 28. In one embodiment, the magnets 74 are oriented so that the poles of the magnets alternate around the collar 72. More specifically, the magnet 74A has a radially outward north pole 82A, the magnet 74B has a radially outer south pole 82B, the magnet 74C has a radially outer north pole 82C, and so on around the collar 72. The alternating poles of the magnets 74 creates a series of differently oriented magnetic fields that the coil 76 passes through as the wheel hub 18 turns relative to the spacer 28 and spindle thereon. This increases the electrical current produced by the relative movement of the coil 76 and the magnets 74.

The spacer 28 has a tubular configuration with an outboard rim 86, an inboard rim 88, and the side wall 80 extending therebetween. The side wall 80 extends around a bore 90 of the spacer 28 that receives the spindle of the vehicle axle. The spacer 28 may also include a tapered portion 92 extending radially outward away from the outboard rim 86 toward the collar 72. The annular body 75 of the collar 72 has an opening 77 that receives the side wall 80 as the collar 72 is slid onto the spacer 28. In one approach, the collar 72 is pressed onto the spacer 28. In another embodiment, the collar 72 is fixed to the spacer 28 using welds, fasteners, or adhesive as some examples.

The spacer 28 is manufactured with tight tolerances to accurately separate the inboard and outboard bearings 24, 26. Because the collar 72 is connected to the spacer 28, the collar 72 can be manufactured with looser tolerances than the spacer 28 and connected to the spacer 28. This makes manufacture of the hub assembly 10 easier. In another embodiment, the one or more magnets 74 may be portions of the spacer 28, such as the magnets 74 being molded into the spacer 28. As another example, the magnets 74 may be directly mounted to the spacer 28 using welds, fasteners, or adhesive, as some examples.

With reference to FIG. 1, the wheel hub assembly 10 includes a grease pocket, such as a hub cavity 100 containing a lubricant, such as grease or oil. The hub cavity 100 is in communication with one or more of the inboard and outboard bearings 24, 26. The lubricant reduces friction in the inboard and outboard bearings 24, 26 and helps the wheel hub 18 turn around the axis 50. The wheel hub assembly 10 includes a lubricant seal 102 configured to resist egress of the lubricant at an inboard side of the hub assembly 10. The lubricant seal 102 also resists the ingress of debris into the interior 13 of the wheel hub 18. The drive flange 230 resists egress of the lubricant at the outboard side of the hub assembly 10. The wheel hub assembly 10 may be used as a non-drive wheel, such that there is no drive shaft extending in the spindle and there is no drive shaft flange 230 mounted to the wheel hub 18. Rather, the wheel hub assembly 10 would include a hub cap that covers an outboard opening 231 of the wheel hub 18 and resists egress of the lubricant in the outboard direction.

In the embodiment of FIG. 1, the magnets 74 and the coil 76 are in the hub cavity 100. This means that the one or more magnets 74 and coil 76 are in contact with, such as submerged in, the lubricant contained in the hub cavity 100. The lubricant may be oil and the magnets 74 and coil 76 may be submerged in an oil bath. Further, the magnets 74 and the coil 76 are subjected to the flow of lubricant generated by the relative movement of the wheel hub 18 around the spacer 28. By positioning the magnets 74 and the coil 76 within the cavity 100, the magnets 74 and coil 76 are protected from the harsh road environment and from tampering.

Figure 3:
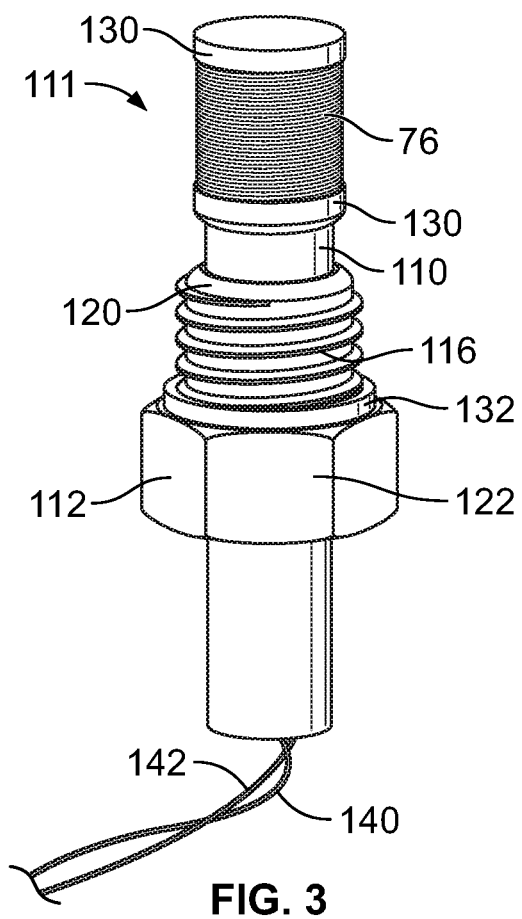
FIG. 3 is a perspective view of a support of the electric generator having a coil of wire thereon that interacts with magnetic fields produced by the magnets of the spacer of FIG. 2 to generate electricity.

Regarding FIG. 3, the wheel hub assembly 10 has a coil assembly 111 that includes the bobbin 110, the coil 76, and a fill plug 112. The fill plug 112 closes a fill opening 114 (see FIG. 1) of the wheel hub 18. The fill opening 114 is used to fill the hub cavity 100 with lubricant. The fill plug 112 has an annular wall with a threaded portion 116 that engages threads 118 (see FIG. 1) of the fill opening 114. The bobbin 110 extends from a driving portion 122 of the fill plug 112. The driving portion 122 may include faceted surfaces, such as a hex pattern, to receive a wrench or socket for tightening the fill plug 112 in the fill opening 114. The bobbin 110 includes a cylindrical portion around which the turns of the coil 76 is wound and flanges 130 on opposite sides of the coil 76. The fill plug 112 further includes an O-ring 132 for forming a fluid tight seal with the wheel hub 18.

In one embodiment, the coil assembly 111 includes a single wire wound to form the coil 76. The single wire has a pair of wire ends 140, 142 that extend from the coil 76, through an inner bore of the fill plug 112, and out from the fill plug 112. The wires 140, 142 are connected to the device 60 for providing electrical power thereto. In another embodiment, the coil assembly 111 may include two or more wires each having a coil 76 formed therein and a pair of ends that connect to the device 60. In one approach, electromagnetic induction generator 70 may utilize a wireless power transmission approach for providing electricity to the device 60.

The coil 76 may be connected to the wheel hub 18 in a variety of approaches. For example, the bobbin 110 may include a core around which the turns of the coil 76 extends. The core may be made of, for example, a plastic or a metallic material. The core may be made of a non-electrically conductive and magnetically permeable material. As another example, the coil 76 may be free standing and adhered to an inner surface 113 (see FIG. 1) of the wheel hub 18.

Figure 4:
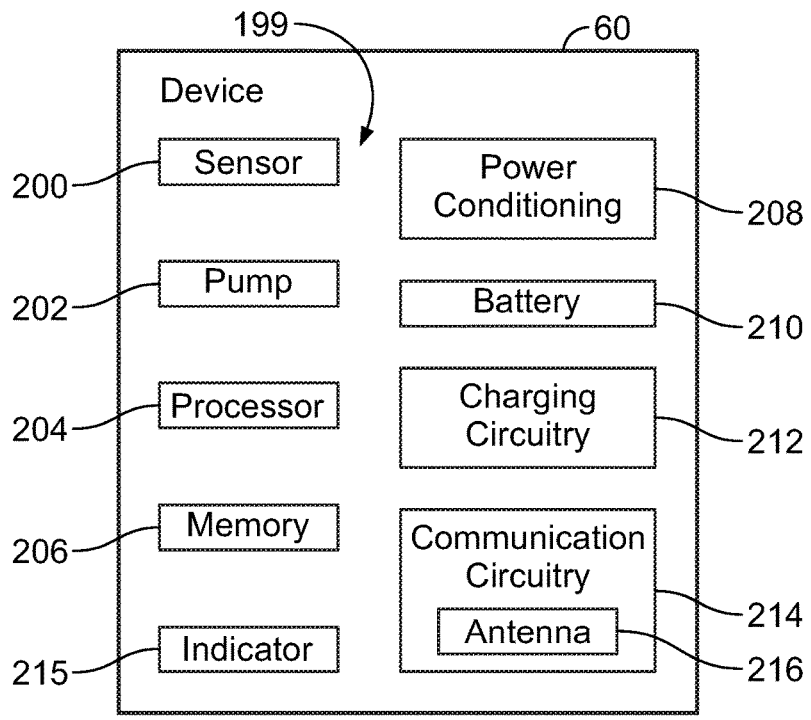
FIG. 4 is a schematic representation of the device of FIG. 1.

Regarding FIG. 4, the device 60 may include one or more wheel end devices 199 configured to provide one or more functions related to, for example, the wheel hub assembly 10 and/or the wheel mounted thereto. For example, the wheel end device 199 may include one or more sensors 200, such as a pressure sensor, a temperature sensor, a proximity sensor, an accelerometer, a gyroscope, a velocity sensor, a strain gauge, a load cell, a capacitance transducer, a resistive transducer, a global navigation satellite system receiver, a radio frequency analyzer, an electromagnetic interference transducer, a phototransducer, or a combination thereof. The one or more wheel end devices 199 may include a pump, such as an air pump 202, for adjusting the tire pressure of the tire(s) associated with the wheel hub 18.

The device 60 may include a processor 204 for controlling operation of the device 60 and utilizing computer-readable instructions stored in a non-transitory computer readable medium, such as a memory 206. For example, the device 60 may include an ASIC including the processor 204 and the memory 206.

The device 60 may include a power conditioning circuit 208 that conditions the electrical energy from the coil 76 into a format that is more readily utilized by the device 60. The device 60 may include or be connected to a battery 210 that stores electrical power produced from the coil 76. For example, the coil 76 may periodically produce electrical energy in excess of the requirements of the device 60, such as when the vehicle is on the highway and the wheel hub 18 is rotating at high speed, and the device 60 may store the excess electrical energy in the battery 210. The battery 210 may be utilized to provide electrical energy for the device 60 when the coil 76 is producing an insufficient amount of energy, such as low speeds of the vehicle and associated lower rotational speeds of the wheel hub 18. In this manner, the battery 210 may serve as a backup power supply to the device 60 and the electrical power from the coil 76 may serve as the primary power source. In another embodiment, the battery 210 is the primary power supply and the coil 76 provides energy for charging the battery 210 and, optionally, may be used in parallel with the battery 210 to provide electrical power for the device 60 in high-demand situations. The device 60 may also include charging circuitry 212 that facilitates charging of the battery 210 using the electrical energy from the coil 76.

The device 60 may also include communication circuitry 214 that includes one or more wired and/or wireless communication interfaces. For example, the communication circuitry 214 may include short-range and/or long-range wireless communication interfaces. The communication circuitry 214 may include an antenna 216 for wireless communication with one or more wheel end monitoring devices via a wireless protocol. The wheel end monitoring devices may include, for example, a user device 221 such as a smartphone, a tablet computer, a wearable device, or a PC; a computer of vehicle 220; and/or a server computer 223.

Figure 5:
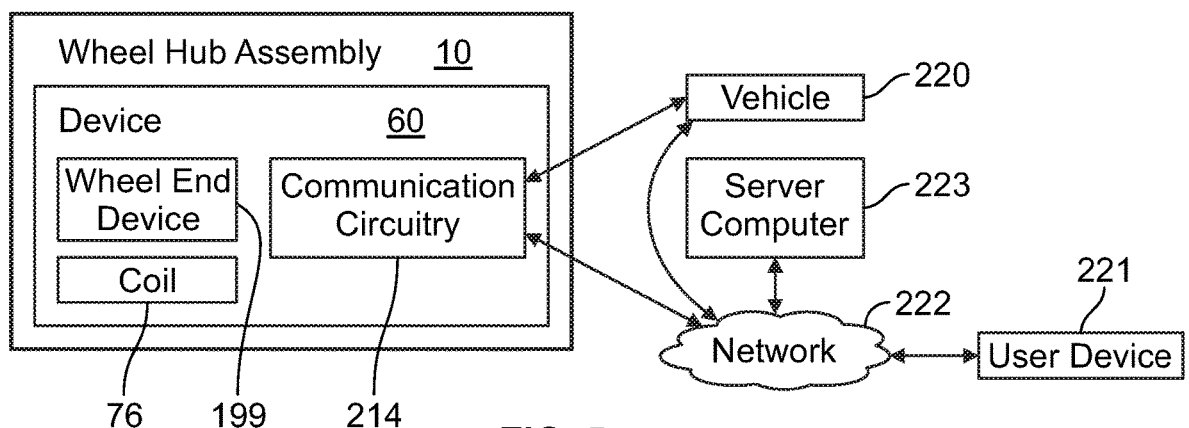
FIG. 5 is a schematic representation of the device of FIG. 1 communicating with wheel end monitoring devices.

As shown in FIG. 5, the communication circuitry 214 may be configured to communicate directly with the vehicle 220 and may be configured to communicate indirectly with the user device 221 over a network 222. For example, the communication circuitry 214 may include a radio frequency transmitter that transmits encoded signals containing information regarding measurements from the sensor 200 to a receiver of the vehicle 200. As another example, the communication circuitry 214 may include a short-range Bluetooth transceiver that communicates with a Bluetooth transceiver of the vehicle.

The network 222 may include a short range network, such as a mesh network constituted by components of the vehicle, a long-range wireless network such as a cellular (3G, 4G, 4G LTE, or 5G) network, and/or the internet. Other examples of long-range networks include WiMax and LoRaWAN networks.

As an example, the communication circuitry 214 may communicate indirectly with the user device 221 via the server computer 223 and the network 222. As an example, the sensor 200 may include a tire pressure sensor for a wheel associated with the wheel hub assembly 10 and the processor 204 causes the communication circuitry 214 to transmit tire pressure data to the server computer 223 via the network 222. The server computer 223 monitors the tire pressure and, upon the tire pressure going above or below a threshold, the server computer 223 sends a communication to the processor 204 via the network 222 and communication circuitry 214. The processor 204 responsively causes the pump 202 to increase or decrease tire pressure as requested by the server computer 223.

The communication circuitry 214 may also be configured to communicate directly with the user device, such as via a Bluetooth connection with a smartphone or a tablet computer. The communication circuitry 214 may communicate information to the user device 221 such as operating status, current sensor readings, historical sensor readings, and maintenance information. This permits a user to walk around the vehicle and establish a communication link with each device 60 to quickly and easily check the status of the wheel ends of the vehicle.

As another example, the communication circuitry 214 may utilize a short-range wireless protocol, such as Bluetooth, to send information to and/or receive information from the vehicle 220. The vehicle 220 has a long-range wireless communication interface, such as a cellular network interface, that permits the vehicle 220 to act as an access point to the network 222 and facilitates communication with the server computer 223 and/or user device 221.

Regarding FIG. 4, the device 60 may also include an indicator 215 for providing status information to a user. For example, the indicator 215 may include one or more lights with different colors to indicate different statuses, e.g., a green light indicating the device 60 is operational, a red light indicating an error state, and a flashing red light indicating a communication link error. As another example, the indicator 215 may include a speaker for communicating status information to the user.

The electromagnetic induction generator 70 may have a variety of configurations. For example, the one or more magnets 74 may be mounted to or integrated with one or more of the bore retaining ring 44, spindle retaining nut 42, spindle nut washer 40, the outboard or inboard bearing cones 30, and/or the nut-retaining ring 46. The one or more coils 76 may be mounted to or integrated with the drive flange 230 of the drive axle or a hub cap if the wheel hub assembly 10 is not connected to a drive axle. In this manner, the drive flange 230 or the hub cap and the one or more coils 76 thereof would rotate relative to the magnets of the nut-retaining ring 46, bore retaining ring 44, retaining nut 42, and/or outboard bearing cone 30 which mounted to the non-rotating vehicle spindle. In this embodiment, the drive flange 230 or hub cap operates to create a cavity 232 (see FIG. 1) of the wheel hub assembly 10 that protects the one or more coil 76 and the one or more magnets 74 from the road environment and from tampering.

As another embodiment, the one or more coils 76 may be mounted to or integral with one or more of the static components of the wheel hub assembly 10, e.g., the spindle retaining nut 42, the bore retaining ring 44, the nut-retaining ring 46, the spacer 28, the cone 30 of the inboard bearing 24, and/or the cone 30 of the outboard bearing 26. The one or more magnets 74 may be mounted to or integral with the wheel hub 18, drive flange 230, and/or hub cap. This permits electrical power to be generated on a static component rather than a rotating component.

Figure 6:
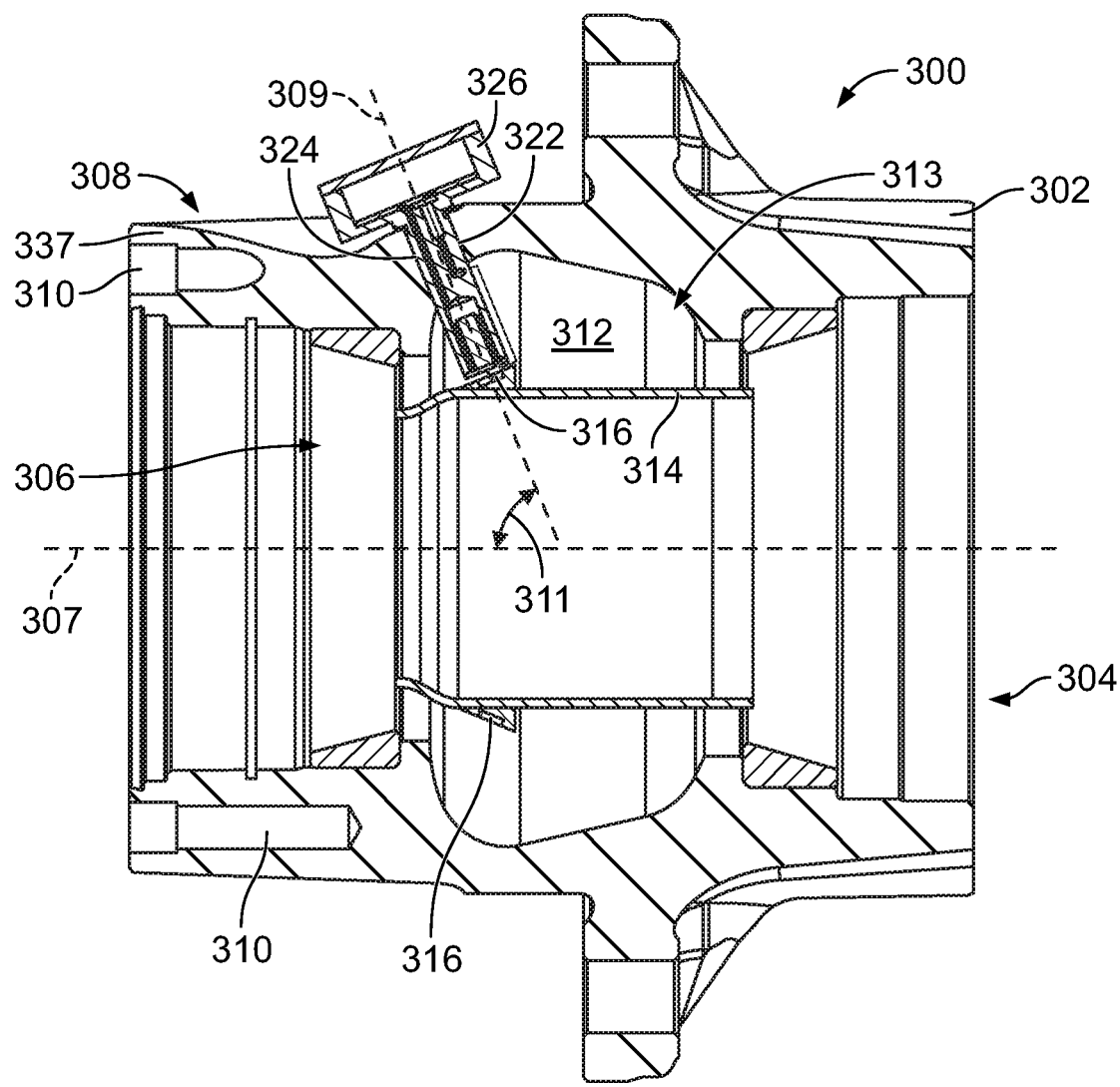
FIG. 6 is a cross-sectional view of another wheel hub assembly having an electric generator for providing electrical power to a device of the wheel hub assembly.

With reference to FIG. 6, a portion of the wheel hub assembly 300 is provided that is similar to the wheel hub assembly 10 discussed above such that differences will be highlighted. The wheel hub assembly 300 includes a wheel hub 302 having a through hole or hub bore 304 configured to receive a spindle of a vehicle. The wheel hub 302 has an interior 306 and an exterior 308. The wheel hub 302 includes recesses 310 configured to receive fasteners. These fasteners may be used for connecting the wheel hub 302 to a drive flange of a drive axle shaft of the vehicle. Once the wheel hub 302 is connected to the drive axle shaft, rotation of the drive axle shaft causes rotation of the wheel hub 302 around the spindle. The wheel hub 302 has a cavity 312 at the interior 306 of the wheel hub 302 that cooperates with a spacer 314 to form a grease pocket 313 of the wheel hub assembly 300. When the wheel hub 302 is mounted on the spindle, the grease pocket provides the inboard and outboard bearings (only the cups of which are shown for clarity purposes) of the wheel hub assembly 300 with lubrication. The spacer 314 and inboard and outboard bearings have aligned through openings sized to receive the spindle. The spacer 314 separates the inboard and outboard bearings, which are on opposite sides of the cavity 312.

The wheel hub assembly 300 further includes one or more magnets 316. The magnets 316, for example, may be permanent magnets or an electromagnet powered by a vehicle power supply. As examples, the permanent magnets may be neodymium iron boron, samarium cobalt, alnico, ceramic and/or ferrite magnets. The one or more magnets 316 may be mounted to the spindle within the grease pocket 313. In the embodiment of FIG. 6, the magnets 316 are mounted to the spacer 314 within the grease pocket 313. The magnets 316 may have an annular configuration about an axis 307 of rotation of the wheel hub 302. The magnets 316 may be arranged such that the magnetic poles of the magnets are alternately arranged, i.e., the magnetic pole of each magnet positioned adjacent to the coil 318 is the opposite of the adjacent magnets. As an example, each magnet 316 may be oriented such that the north pole of the magnet faces radially inward or outward from the axis 307 of rotation of the wheel hub 302 and the north pole of the adjacent magnets face the opposite direction. As shown in the embodiment in FIG. 6, the magnets 316 may also be configured so that the primary magnetic flux direction of each magnet aligns with a central axis 309 of a coil 318 of wire (see FIG. 7). The coil 318 and magnets 316 may be inclined so that the axis 309 extends transversely, such as obliquely, at an angle 311 relative to the axis 307.

Figure 7:
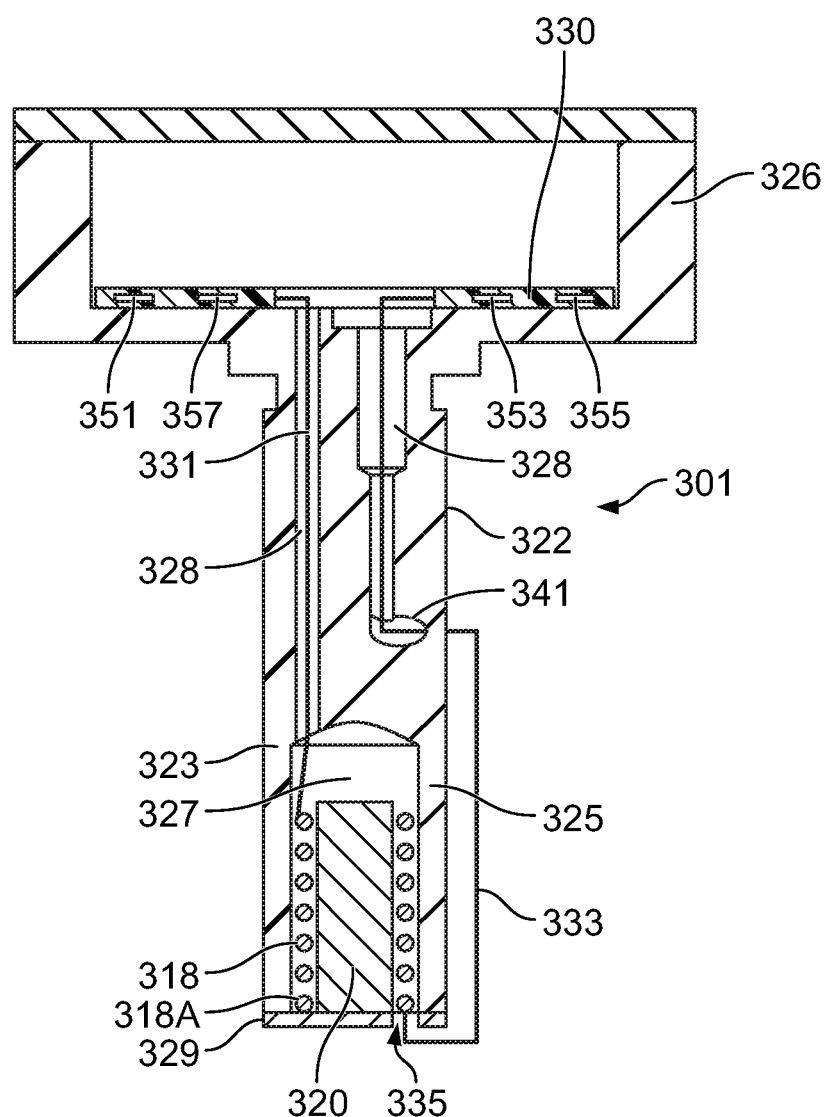
FIG. 7 is a cross-sectional view of a device of the electric generator of the wheel hub assembly of FIG. 6 showing a coil of wire of the device having ends extending through a support of the device.

With reference to FIG. 7, the wheel hub assembly 300 includes a device 301 including the coil 318. The coil 318 may be insulated or enameled copper or aluminum wire. The wire may be wound about the axis 309 to form a substantially cylindrical helix of wire. The number of turns or windings of the coil 318 affects the voltage produced by the coil 318. The coil 318 may have one, two, three, or more turns. The desired voltage may vary for different applications and the voltage produced by the coil 318 may be determined using Faraday's law of induction. For a tightly wound coil of wire having N identical turns, each with the same (ΦB, Faraday's law of induction states that:

$$\varepsilon = -N\frac{d\Phi_B}{dt}$$

where N is the number of turns of wire and ΦB is the magnetic flux through a single loop.

The wire may also be wound about a core 320, although an air core may be used. The core 320 may be made of metallic material such as ferrite, iron, or steel. The device 301 may include a body 322 having a support 323 for the coil 318. The body 322 may be made of a metallic or plastic material as some examples. The support 323 includes an annular wall 325 extending about a blind bore 327. The core 320 and coil 318 wrapped therearound may be loaded into the blind bore 327 and a cover 329 secured to the annular wall 325 to form a compartment for the coil 318 and the core 320. The compartment formed by the cover 329 and annular wall 325 may be sealed, such as preventing the ingress of lubricant into the compartment. The wire of the coil 318 may include a first end 331 and a second end 333. The second end 333 may extend out from the support 323 via an opening 335 in the cover 329.

The support 323 extends from a wall 337 (see FIG. 6) of the wheel hub 302 into the wheel hub cavity 312. In one example, the support 322 is integral with the wheel hub 302. In other examples, the support 322 is a separate component that is permanently fixed or removably attached to the wheel hub 302. In the example shown in FIG. 6, the device 301 is removably attached to the wheel hub 302 and extends through a lubricant fill opening 324 the wheel hub 302. The device 301 may have threads to engage threads of the opening 324 of the wheel hub 302. The device 301 may include an O-ring to seal the aperture 324 and contain the lubricant in the grease pocket 313 of the wheel hub 302. The device 301 may also include a compartment 326 for housing electronic components outside of the wheel hub 302 while the support 323 positions the coil 318 in the wheel hub 302.

The wheel hub assembly 300 is configured to maximize the efficiency of the electrical power induction. For example, the support 323 positions the coil 318 such that the coil 318 passes directly over the magnet or magnets 316 mounted to the spindle when the wheel hub 302 is rotated. The support body 322 may be configured to position the coil 318 such that an end 318A of the coil 318 passes in close proximity to the magnets 316 such that an air gap between the cover 329 and the magnets are minimized relative to the manufacturing tolerances of the wheel hub assembly 300, which increases the efficiency of the electric power induction in the coil 318. The support 323 also positions the coil 318 such that the central axis 309 of the coil 318 momentarily aligns with the primary magnetic flux direction of the magnets 316 as the wheel hub 302 rotates about the spindle. This arrangement also increases the efficiency of the electrical power induction in the coil 318 because it maximizes the magnetic flux through the coil 318. Still further, the core 320 operates to increase the efficiency of the electrical power induction because the core 320 has a high magnetic permeability which permits the core 320 to guide magnetic flux through the windings of the coil 318.

Regarding FIG. 7, the support 322 includes one or more channels 328 for the ends 331, 333 of the coil 318 to pass through. The channels 328 direct the ends 331, 333 from the coil 318 in the wheel hub 302 to an electrical component, such as a circuit board 330, outside of the wheel hub 302. In the embodiment of FIG. 7, the end 333 of the wire extends along an outer surface of the support 323 and enters one of the channels 328 at an opening 341 above the coil of wire 318. The end 331 of the wire, by contrast, extends between the coil 318 and circuit board 330 within the outer channel 328. The separate channels 328 separate the wire ends 331, 333 and permit the wire ends 331, 333 to be connected to the circuit board 330 without interfering with one another. In some embodiments, all or some of the circuitry powered by the coil 318 may be within the wheel hub 302 such that the lengths of the wire ends 331, 333 may be reduced.

The device 301 is similar in many respects to the device discussed above and may include one or more wheel end devices 351, a battery 353, a power conditioning circuit 355, and communication circuitry 357. The power conditioning circuit 355 is operatively coupled to the coil 318. The power conditioning circuit 355 receives the electrical power generated in the coil 318 and conditions the power so that it is usable to power the wheel end device(s) 351 and/or the communication circuitry 357. The power conditioning circuit 355 may include a rectifier circuit and a voltage regulator circuit. The rectifier circuit converts the voltage pulses induced in the coil 318 into a steady direct current form. As an example, the rectifier circuit may be a full-wave rectifier circuit. As another example, the rectifier circuit may be a half-wave rectifier circuit.

The voltage produced in the coil 318 may vary based on the speed at which the wheel hub 302 is rotating around the spindle. A voltage regulator may be used to control the voltage of the rectified electrical power. The voltage regulator may regulate the voltage output to the voltage levels required to power the wheel end devices 351 and/or communication circuitry 357, for example, 3.3 VDC or 5 VDC.

The electrical power induced in the coil 318 may be used to power electronic components of the device 301. The electrical power produced by relative movement of the coil 318 and the magnets 316 permits devices to be utilized at the wheel end that consume large amounts of power, such as high-speed data transmission communication circuitry or high sample rate sensors that otherwise could not be used because they consume too much power for conventional battery-only power. The coil 318 and magnets 316 also allow sensors to be run continuously, if desired, rather than taking data measurements at intervals. In some applications, a power storage device such as battery 333 or a capacitor may be used to power components when the wheel hub 302 is rotating at lower speeds or when the vehicle is stationary.

The wheel end device 351 may be any electronic device similar to those described above including a sensor and/or a pump as examples.

The communication circuitry 357 of the device 301 may be similar to the communication circuitry 214 discussed above. The communication circuitry may include an antenna for wireless communication to a wheel end management device via a wireless communication protocol. Regarding FIG. 7, the communication circuitry 357 including the antenna thereof is positioned in the compartment 326 outside of the wheel hub 302.

In another embodiment, the communication circuitry 357 is positioned in the interior 306 of the wheel hub 302. In this embodiment, the communication circuitry 357 may have at least an antenna of the communication circuitry 357 extending to the exterior 308 of the wheel hub 302 to communicate with other devices.

Figure 8:
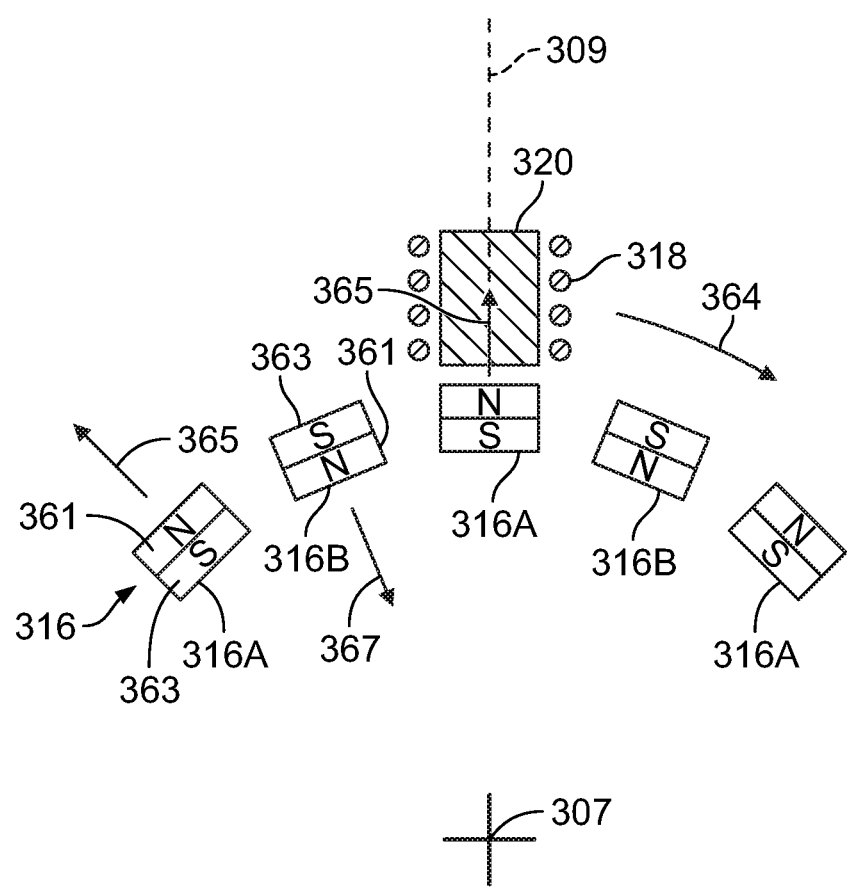
FIG. 8 is a schematic diagram showing the motion of the coil of wire of FIG. 7 relative to magnets of the wheel hub assembly of FIG. 6 as the wheel hub rotates around a spindle.

Regarding FIG. 8, the wheel hub assembly 300 generates electrical power when the wheel hub 302 is rotated in direction 364 about the axis 307 of rotation around the spindle. Rotation of the wheel hub 302 causes rotation of the coil 318 around the magnets 316 as shown in FIG. 8. This causes the coil 318 to pass through the magnetic fields of the magnets 316. As the coil 318 passes over a magnet 316, the strength of the magnetic field passing through the coil 318 changes. The changing magnetic field passing through the coil 318 induces a voltage across the coil 318.

The magnets 316 include magnets 316A having their north poles 361 at a radially outer position and their south poles 363 at a radially inner position. The magnets 316 include magnets 316B having an opposite orientation of their poles 361, 363. The magnets 316A have a radially outward primary flux direction 365 and the magnets 316B have a radially inward primary flux direction 367. The term primary flux direction is intended to refer to the general direction of magnetic flux from the north pole 361 of the magnets 316. By alternating the magnets 316 so that the coil 318 passes adjacent the north pole 361 of a magnet 316A and then the south pole 363 of a magnet 316B, the coil 318 undergoes rapid changes between positive and negative magnetic fields interacting with the coil 318. The rapid changes between positive and negative magnetic fields acting on the coil 318 maximizes the voltage across the ends 331, 333 of the coil 318.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. It is intended that the phrase "at least one of" as used herein be interpreted in the disjunctive sense. For example, the phrase "at least one of A and B" is intended to encompass only A, only B, or both A and B.

What is claimed is:

1. A wheel end apparatus for a vehicle, the wheel end apparatus comprising:
    a wheel hub assembly configured to be mounted to a spindle;
    a wheel hub of the wheel hub assembly rotatable around a central axis, the wheel hub having an interior and a wheel mounting flange;
    a coil of wire and at least one magnet of the wheel hub assembly configured to move relative to one another with rotation of the wheel hub around the spindle;
    an inboard bearing and an outboard bearing of the wheel hub assembly to rotatably support the wheel hub on the spindle, the inboard and outboard bearings in the interior of the wheel hub;
    a spacer of the wheel hub assembly having a bore sized to receive the spindle, the spacer configured to separate the inboard and outboard bearing assemblies along the spindle;
    wherein the coil of wire and the at least one magnet are in the interior of the wheel hub and intermediate the inboard and outboard bearings along the axis of rotation;
    wherein one of the coil of wire and the at least one magnet is associated with the spacer;
    wherein the other of the coil of wire and the at least one magnet is associated with the wheel hub and is rotatable with the wheel hub about the spacer;
    a wheel end device operably coupled to the coil of wire to receive electrical power generated by relative movement of the coil of wire and the at least one magnet; and
    communication circuitry operably coupled to the wheel end device and configured to wirelessly communicate wheel end device information with a wheel end monitoring device.

2. The wheel end apparatus of claim 1
    wherein the communication circuitry includes an antenna outside of the wheel hub.

3. The wheel end apparatus of claim 1 wherein the wheel hub assembly includes the wheel end device and the communication circuitry.

4. The wheel end apparatus of claim 3 wherein the wheel end device and the communication circuitry are supported by the wheel hub and rotate with rotation of the wheel hub around the spindle.

5. The wheel end apparatus of claim 1 wherein the at least one magnet includes an annular arrangement of magnets configured to be disposed about the spindle with the wheel hub assembly mounted to the spindle.

6. The wheel end apparatus of claim 1 wherein the at least one magnet includes a plurality of magnets each having a north pole and a south pole; and
    wherein the magnets have an alternating arrangement configured so that the coil of wire moves adjacent alternating north and south poles of the magnets as the wheel hub rotates around the spindle.

7. The wheel end apparatus of claim 1
    wherein the coil of wire has a central axis extending transverse to the central axis of the wheel hub.

8. The wheel end apparatus of claim 7 wherein the at least one magnet has a primary magnetic flux direction configured to be periodically oriented along the central axis of the coil of wire during rotation of the wheel hub around the spindle.

9. The wheel end apparatus of claim 1 wherein the communication circuitry is configured to communicate the wheel end device information with the wheel end monitoring device via a network.

10. The wheel end apparatus of claim 1 further comprising a battery operably coupled to the coil of wire and configured to be charged with electrical power generated by rotation of the coil relative to the at least one magnet; and
    wherein the battery is configured to provide electrical power to at least one of the wheel end device and the communication circuitry.

11. The wheel end apparatus of claim 1 further comprising a metallic core; and
    wherein the coil of wire is wound around the metallic core.

12. The wheel end apparatus of claim 1 wherein the wheel end device includes a sensor.

13. The wheel end apparatus of claim 1 wherein the wheel end device includes at least one of:
    a tire pressure sensor,
    an air pump,
    an odometer,
    a temperature sensor,
    a vibration sensor,
    a bearing condition monitoring sensor,
    a load measurement sensor,
    a stud tension sensor,
    an oil condition sensor,
    an oil level sensor, a spindle nut torque sensor,
a speed sensor, and
an anti-lock brake sensor.

14. The wheel end apparatus of claim 1 wherein the inboard and outboard bearings each include an inner race, an outer race, and bearing elements between the inner and outer races; and
wherein the wheel hub assembly includes a nut configured to engage the spindle and fix the spacer and the inner races of the inboard and outboard bearing elements to the spindle.

15. The wheel end apparatus of claim 1 wherein the at least one magnet is mounted to the spacer.

16. The wheel end apparatus of claim 1 further comprising a collar on the spacer, the collar connecting the at least one magnet and the spacer.

17. The wheel end apparatus of claim 1 wherein the wheel end device includes a sensor in the interior of the wheel hub.

18. A wheel end system comprising:
a wheel hub rotatable around a central axis, the wheel hub having an annular wall extending about an interior of the wheel hub, the wheel hub having a wheel mounting flange;
at least one bearing mounted in the wheel hub interior and having a bore sized to receive a spindle;
a cavity of the interior of the wheel hub for receiving a lubricant, the cavity opening to the at least one bearing to permit the lubricant to lubricate the at least one bearing;
a through opening in the annular wall of the wheel hub extending transverse to the central axis of the wheel hub and opening to the cavity;
a coil of wire and at least one magnet in the cavity and configured to move relative to one another with rotation of the wheel hub around the spindle;
a wheel end device outside of the wheel hub interior and rotatable with the wheel hub; and
an electrical connector extending in the through opening of the wheel hub annular wall and connecting the wheel end device and the coil of wire such that the wheel end device receives electrical power generated by the relative movement of the coil of wire and the at least one magnet.

19. The wheel end system of claim 18
wherein one of the coil of wire and the at least one magnet is supported by the wheel hub.

20. The wheel end system of claim 18 further comprising an annular member having a through opening that receives the spindle;
wherein one of the coil of wire and the at least one magnet is supported by the annular member.

21. The wheel end system of claim 20 wherein the at least one magnet includes a plurality of magnets; and
wherein the coil of wire and the magnets are configured so that the magnets are sequentially moved in proximity to the coil of wire as the wheel hub rotates around the spindle.

22. The wheel end system of claim 18 wherein the wheel mounting flange extends radially outward from the annular wall, the wheel mounting flange configured to have a wheel mounted thereto;
communication circuitry operably coupled to the wheel end device, the communication circuitry including an antenna operable to wirelessly communicate wheel end device information; and
wherein the antenna and the coil of wire are on opposite sides of the annular wall of the wheel hub.

23. The wheel end system of claim 18 wherein the at least one magnet includes a plurality of magnets in an annular arrangement;
wherein the magnets each have a pair of poles and a primary magnetic flux direction in a radially inward or a radially outward direction; and
wherein the primary magnetic flux direction for each magnet is opposite the magnetic flux direction of the adjacent magnets.

24. The wheel end system of claim 18 further comprising a metallic core in the cavity;
wherein the coil of wire includes a plurality of turns extending around the metallic core.

25. The wheel end system of claim 18 further comprising communication circuitry operably coupled to the wheel end device and configured to wirelessly communicate wheel end device information with a wheel end monitoring device; and
wherein the communication circuitry is outside of the wheel hub interior and rotatable with the wheel hub.

26. The wheel end system of claim 18 wherein the electrical connector comprises a portion of wire, the portion of the wire and the coil made of a single length of wire.

27. A method of utilizing rotation of a wheel hub of a wheel hub assembly mounted to a spindle to operate a wheel end device the wheel hub having an annular wall extending about an interior of the wheel hub, the wheel hub assembly including at least one bearing mounted in the wheel hub interior and having a bore receiving the spindle, the wheel hub having a cavity of the interior of the wheel hub for receiving a lubricant, the cavity opening to the at least one bearing to permit the lubricant to lubricate the at least one bearing, the wheel hub having a through opening in the annular wall that opens to the cavity, the wheel end device outside of the wheel hub interior and rotatable with the wheel hub, the wheel end device including a sensor configured to gather information regarding at least one of tire pressure, temperature, stud tension, oil condition, oil level, and spindle nut torque, the method comprising:
providing electrical power to the wheel end device and communication circuitry by moving a coil of wire and at least one magnet of the wheel hub assembly in the cavity of the wheel hub relative to one another with rotation of the wheel hub of the wheel hub assembly around the spindle, wherein the wheel hub assembly includes an electrical connector extending in the through opening of the wheel hub annular wall and connecting the wheel end device and the coil of wire; and
wirelessly communicating, via the communication circuitry, the information with a wheel end monitoring device.

28. The method of claim 27
wherein wirelessly communicating the wheel end device information with the wheel end monitoring device includes wirelessly communicating the wheel end device information using an antenna of the communication circuitry outside of the wheel hub.

29. The method of claim 27 the cavity of the wheel hub is a grease pocket of the wheel hub assembly.

30. The method of claim 27 wherein moving the coil of wire and the at least one magnet relative to one another includes moving the coil of wire adjacent alternating poles of a plurality of magnets.

31. The method of claim 27 wherein the at least one magnet includes a plurality of magnets in an annular arrangement about the spindle; and wherein moving the coil of wire and the at least one magnet relative to one another includes sequentially aligning a central axis of the coil of wire with a primary magnetic flux direction of each magnet as the wheel hub rotates around the spindle.

32. The method of claim 27 wherein providing electrical power to the wheel end device includes conditioning the electrical power via a conditioning circuit to provide predetermined characteristics of the electrical power and providing the conditioned electrical power to the wheel end device.

* * * * *